United States Patent
Harada et al.

(12)

(10) Patent No.: US 6,410,616 B1
(45) Date of Patent: *Jun. 25, 2002

(54) CROSSLINKED POLYMER PARTICLE AND ITS PRODUCTION PROCESS AND USE

(75) Inventors: Nobuyuki Harada, Suita; Masatoshi Nakamura; Shigenori Kirimura, both of Himeji; Yoshifumi Adachi, Himeji, all of (JP)

(73) Assignee: Nippon Shokubai Co., LTD, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/287,509

(22) Filed: Apr. 7, 1999

(30) Foreign Application Priority Data

Apr. 9, 1998 (JP) ............................................ 10-097477

(51) Int. Cl.$^7$ .................................................. C08J 3/00
(52) U.S. Cl. ...................................... 523/337; 523/216
(58) Field of Search ......................................... 523/337

(56) References Cited

U.S. PATENT DOCUMENTS

| | | | | |
|---|---|---|---|---|
| 4,224,427 A | * | 9/1980 | Mueller | ........................ 526/93 |
| 4,427,822 A | * | 1/1984 | Nishizawa | ................... 524/726 |
| 4,459,378 A | * | 7/1984 | Ugelstad | .................... 523/205 |
| 4,694,035 A | * | 9/1987 | Kasai | ......................... 524/458 |
| 4,729,892 A | * | 3/1988 | Beall | ............................ 424/9 |
| 4,732,968 A | | 3/1988 | Obayashi et al. | |
| 4,833,198 A | | 5/1989 | Stanley, Jr. et al. | |
| 5,008,298 A | * | 4/1991 | Allen | .......................... 521/139 |
| 5,037,716 A | * | 8/1991 | Moffat | ........................ 430/609 |
| 5,254,283 A | * | 10/1993 | Arnold | ................... 252/174.12 |
| 5,258,448 A | | 11/1993 | Mallo et al. | |
| 5,288,763 A | * | 2/1994 | Li | ................................ 521/61 |
| 5,583,162 A | * | 12/1996 | Li | ................................ 521/56 |
| 5,882,783 A | * | 3/1999 | Timmerman | ................ 428/327 |

FOREIGN PATENT DOCUMENTS

| | | |
|---|---|---|
| JP | 6-507931 | 9/1994 |
| JP | 8-157532 | 6/1996 |
| WO | WO 92/20735 | 11/1992 |
| WO | WO 96/39464 | 12/1996 |
| WO | WO 98/24832 | 6/1998 |
| WO | WO 98/37149 | 8/1998 |
| WO | WO 99/34841 | 7/1999 |

* cited by examiner

*Primary Examiner*—Paul R. Michl

(57) ABSTRACT

The present invention provides a process in which no surfactant is used, or even if the surfactant is used the amount thereof is as small as possible, thus stably obtaining a suspension to carry out a crosslinking reaction. A production process for a crosslinked polymer particle, comprising the steps of: forming a suspension in which liquid drops of a first phase are dispersed in a second phase by stirring both phases in the presence of an inorganic particle, wherein the first phase includes a high-molecular compound and a crosslinking agent, and wherein the first phase and the second phase are insoluble in each other, and wherein the affinity of the inorganic particle for water is different from that of the high-molecular compound; and carrying out a crosslinking reaction. Furthermore, an approximately spherical crosslinked polymer particle, which is free from a surfactant.

4 Claims, 3 Drawing Sheets

CROSSLINKED POLYMER PARTICLE AND ITS PRODUCTION PROCESS AND USE

BACKGROUND OF THE INVENTION

A. Technical Field

The present invention relates to a crosslinked polymer particle and its production process and use.

B. Background Art

In recent years, synthetic water-absorbing materials, which are called water-absorbent resins, have been developed and are being put to practical use not only as constituent materials of sanitary materials such as sanitary napkins and disposable diapers, but also for purposes which need the water-absorbent resin, for example, industrial purposes such as sealing materials, dewfall-preventive materials, freshness-keeping materials, and solvent-dehydrating materials, and water-holding purposes in such as tree planting, agriculture, and horticulture.

As to the above water-absorbent resin, many ones as obtained by giving a crosslinked structure to hydrophilic high-molecular compounds are known, and examples thereof include: crosslinked polymers of partially neutralized polyacrylic acids; hydrolyzed products of starch-acrylonitrile graft polymers; neutralized products of starch-acrylic acid graft polymers; saponified products of vinyl acetate-acrylic acid ester copolymers; hydrolyzed products of acrylonitrile- or acrylamide copolymers, or their crosslinked polymers; and crosslinked polyethylenimine.

Examples of processes for giving a crosslinked structure to high-molecular compounds include: a process in which a high-molecular compound is obtained and then post-crosslinked by adding thereto a crosslinking agent during or after polymerization; and a process in which a predetermined amount of an internal-crosslinking agent is beforehand added to a monomer to carry out polymerization to obtain a high-molecular compound, and a crosslinking reaction of the resultant high-molecular compound is carried out simultaneously with or after the polymerization. These crosslinking reactions may be carried out either in a solution or suspension state, but the crosslinking reaction in the suspension state has advantages in that a crosslinked polymer can be obtained in the form of approximately spherical particles, and further in that it is easy to control the size of such particles. However, the crosslinking reaction in the suspension state has various problems in that a surfactant needs to be used to stably obtain a suspension and remains in the resultant crosslinked polymer particles even after polymerization and is therefore still contained further in products. For example, the use of the resultant crosslinked polymer particles for disposable diapers has problems in that the surfactant flows from the polymer particles due to external pressure or with time to decrease the surface tension of the absorbed liquid, thus causing the deterioration of the water absorption properties of the crosslinked polymer, or in that some surfactants are unfavorable in view of the safety. In addition, there are also problems in that the surfactant lowers the heat resistance. It may be possible to decrease the content of the surfactant to some extent by washing the crosslinked polymer particles as obtained using the surfactant, but it is impossible to make the content zero, and the process becomes complicated because the number of the steps increases by one.

SUMMARY OF THE INVENTION

A. OBJECT OF THE INVENTION

An object of the present invention is to provide a process in which o surfactant is used, or even if the surfactant is used, the amount thereof is as small as possible, thus stably obtaining a suspension to carry out a crosslinking reaction.

B. DISCLOSURE OF THE INVENTION

To solve the above problems, the present invention provides the following constitutions:

(1) A production process for a crosslinked polymer particle, comprising the steps of:

forming a suspension in which liquid drops of a first phase are dispersed in a second phase by stirring both phases in the presence of an inorganic particle, wherein the first phase includes a high-molecular compound and a crosslinking agent, and wherein the first phase and the second phase are insoluble in each other, and wherein the affinity of the inorganic particle for water is different from that of the high-molecular compound; and carrying out a crosslinking reaction.

(2) A production process according to constitution (1) above, comprising the steps of:

forming a water-drop-in-oil type suspension by stirring a water phase and an oil phase in the presence of a hydrophobic inorganic particle, wherein the water phase includes a hydrophilic high-molecular compound and a crosslinking agent; and carrying out a crosslinking reaction.

(3) A production process according to constitution (2) above, wherein the hydrophilic high-molecular compound is a cationic, anionic, or nonionic polymer.

(4) A production process according to constitution (2) or (3) above, wherein the hydrophobic inorganic particle is hydrophobic fumed silica.

(5) A production process according to any one of constitutions (1) to (4) above, wherein the amount of the inorganic particle relative to the first phase including the high-molecular compound and the crosslinking agent is in the range of 0.001~10 weight %.

(6) An approximately spherical crosslinked polymer particle, which is free from a surfactant.

(7) An approximately spherical crosslinked polymer particle according to constitution (6) above, being used as either one or both of an anionic and a cationic water-swellable crosslinked polymer particle, wherein the anionic and the cationic water-swellable crosslinked polymer particle are combined to give a pair of crosslinked polymer particles which are favorable for absorption of electrolyte solutions, and wherein 50~100% of functional groups in the polymer molecule of the anionic water-swellable crosslinked polymer particle are acid groups, and 50~100% of functional groups in the polymer molecule of the cationic water-swellable crosslinked polymer particle are basic groups.

(8) An approximately spherical crosslinked polymer particle according to constitution (7) above, being used as either one or both of the anionic and the cationic water-swellable crosslinked polymer particle, wherein the anionic water-swellable crosslinked polymer particle is at least one member selected from the group consisting of crosslinked polyacrylic acids, crosslinked polymaleic acids, and their derivatives, and wherein the cationic water-swellable crosslinked polymer particle is at least one member selected from the group consisting of crosslinked polyethylenimines, crosslinked polyallylamines, and their derivatives.

(9) An absorbent article, comprising the approximately spherical crosslinked polymer particle as recited in constitution (6) above.

These and other objects and the advantages of the present invention will be more fully apparent from the following detailed disclosure.

DETAILED DESCRIPTION OF THE INVENTION

Figure 1:
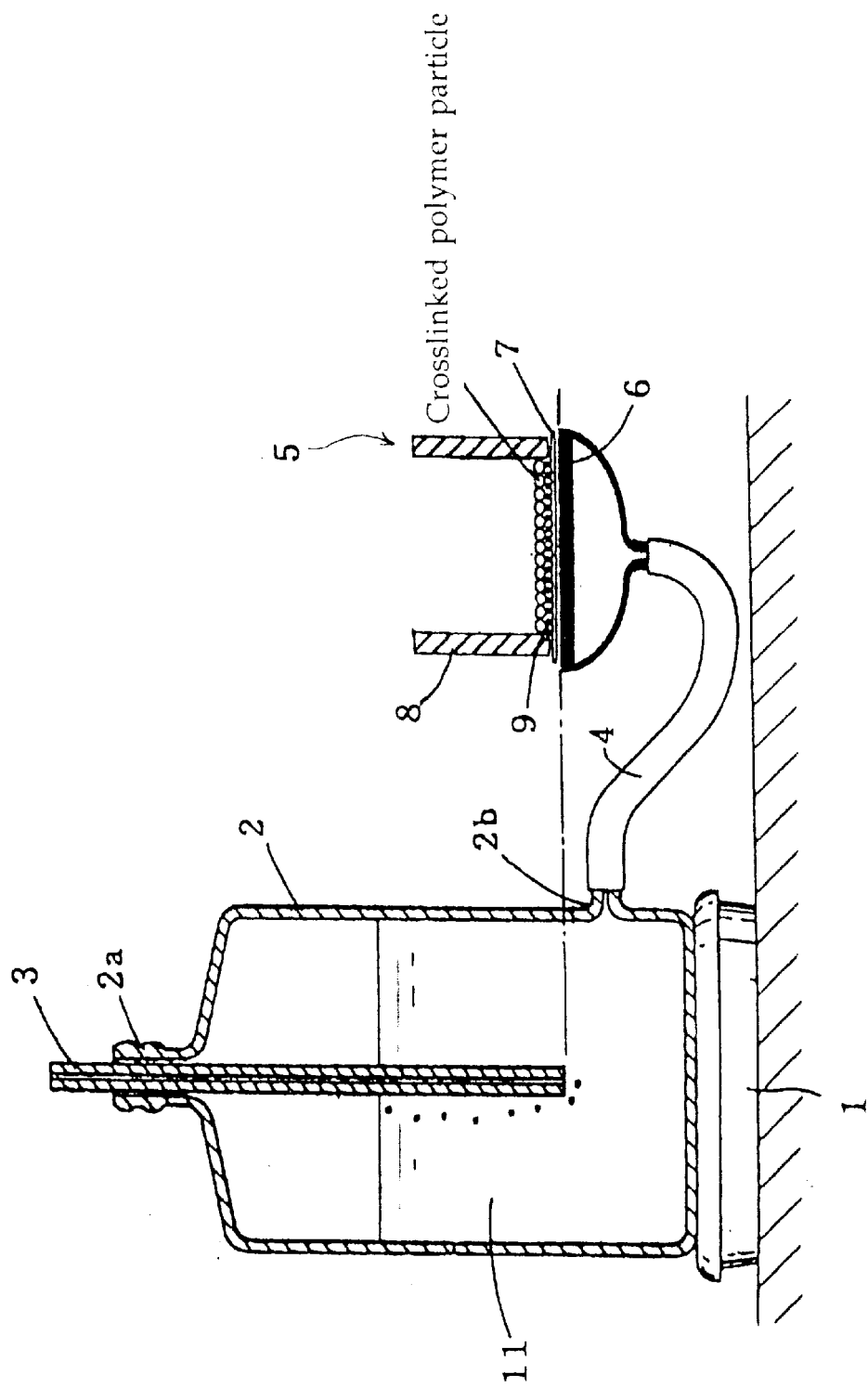
FIG. 1 is a scheme of a measurement apparatus for the free swelling capacity.

The present invention involves the introduction of a crosslinked structure by post-crosslinking the high-molecular compound in a suspension state, and is most characterized by involving the use of the inorganic particle of which the affinity for water is different from that of the high-molecular compound. The first phase and the second phase are stirred in the presence of the inorganic particle (wherein the first phase includes the high-molecular compound and the crosslinking agent, and the first phase and the second phase are insoluble in each other), whereby the inorganic particle aggregates onto surfaces of liquid drops of the first phase and thus plays a part as it were like a surfactant, so that the liquid drops become stabilized.

That is to say, when a hydrophilic high-molecular compound is used, the inorganic particle of which the affinity for water is different from that of the hydrophilic high-molecular compound is a hydrophobic inorganic particle, and the first phase is a water phase, so the second phase insoluble in each other therewith is an oil phase, and the resultant suspension is a water-drop-in-oil type. On the other hand, when a hydrophobic high-molecular compound is used, the inorganic particle of which the affinity for water is different from that of the hydrophobic high-molecular compound is a hydrophilic inorganic particle, and the first phase is an oil phase, so the second phase insoluble in each other therewith is a water phase, and the resultant suspension is a oil-drop-in-water type.

The hydrophilic high-molecular compound usable in the present invention may be any of a cationic polymer, an anionic polymer, and a nonionic polymer.

Examples of the cationic polymer include: homo- or copolymers, which are obtained by polymerizing at least one member selected from the group consisting of N,N-dimethylaminoethyl (meth)acrylate, N,N-diethylaminoethyl (meth) acrylate, N, N-dimethylaminopropyl (meth) acrylamide, N,N-diethylaminopropyl (meth)acrylamide, 2-vinylpyridine, 4-vinylpyridine, N,N-dimethyl(meth) allylamine, and their quaternary salts; polyallylamine, polyvinylamine, polyethylenimine, polyalkylenimine, and their salts; chitosan, methyl glycol chitosan, and cationized starch.

Examples of the anionic polymer include: polymers having a carboxyl group in their molecules, such as homo- or copolymers (which are obtained by polymerizing at least one member selected from the group consisting of (meth) acrylic acid (or salts thereof), itaconic acid (or salts thereof) and maleic acid (or salts thereof)) and alginic acid (or salts thereof); polymers having a sulfonic acid group in their molecules, such as homo- or copolymers (which are obtained by polymerizing at least one member selected from the group consisting of 2-(meth)acrylamido-2-methylpropanesulfonic acid (or salts thereof), sulfoethyl (meth)acrylate, styrenesulfonic acid (or salts thereof), (meth)allylsulfonic acid (or salts thereof) and vinylsulfonic acid (or salts thereof)) and polyvinylsulfuric acid (or salts thereof); and polymers having a phosphoric acid group in their molecules, such as polyvinylphosphoric acid (or salts thereof).

Examples of the nonionic polymer include polyvinyl alcohol, polyacrylamide, polyvinylpyrrolidone, poly(N-acetoamide), and poly(N-alkylacrylamide).

Examples of the hydrophobic high-molecular compound in the present invention include: polymers of monoalkenylarene monomers such as styrene, a-methylstyrene, chloromethylstyrene, vinylethylbenzene, and vinyltoluene; and polymers of (meth)acrylates such as 2-ethylhexyl (meth) acrylate, n-butyl (meth)acrylate, isobutyl (meth)acrylate, t-butyl (meth)acrylate, and hexyl (meth)acrylate. It is preferable that these hydrophobic high-molecular compounds have in their molecules a functional group to react upon the crosslinking agent, such as epoxy, amnino, carboxyl, or hydroxyl.

The amount of the high-molecular compound in the first phase is not especially limited, but is preferably in the range of 1~99 weight %. In the case where the amount is smaller than the above range, the crosslinked polymer particle might not be obtained. In the case where the amount exceeds the above range, the concentration of the high-molecular compound in the first phase might be so excessively high that the crosslinking might be non-uniform because of high viscosity of the first phase.

The crosslinking agent is not limited if it has two or more functional groups reactable upon a functional group of the high-molecular compound. Examples thereof include: polyhydric alcohol compounds such as ethylene glycol, diethylene glycol, propylene glycol, triethylene glycol, tetraethylene glycol, polyethylene glycol, 1,3-propanediol, dipropylene glycol, 2,2,4-trimethyl-1,3-pentanediol, polypropylene glycol, glycerol, polyglycerol, 2-butene-1,4-diol, 1,3-butanediol, 1,4-butanediol, 1,5-pentanediol, 1,6-hexanediol, 1,2-cyclohexanedimethanol, 1,2-cyclohexanol, trimethylolpropane, diethanolamine, triethanolamine, polyoxypropylene, oxyethylene-oxypropylene block copolymer, pentaerythritol and sorbitol; polyepoxy compounds such as ethylene glycol diglycidyl ether, polyethylene glycol diglycidyl ether, glycerol polyglycidyl ether, diglycerol polyglycidyl ether, polyglycerol polyglycidyl ether, propylene glycol diglycidyl ether, polypropylene glycol diglycidyl ether and glycidol; polyamine compounds, such as ethylenediamine, diethylenetriamine, triethylenetetraamine, tetraethylenepentaamine, pentaethylenehexaamine and polyethylenimine, and their inorganic or organic salts (for example, azetidinium salts); polyisocyanate compounds such as 2,4-tolylene diisocyanate and hexamethylene diisocyanate; polyoxazoline compounds such as 1,2-ethylenebisoxazoline; alkylene carbonate compounds such as 1,3-dioxolan-2-one, 4-methyl-1,3-dioxolan2-one, 4,5-dimethyl-1,3-dioxolan-2-one, 4,4-dimethyl-1,3-dioxolan-2-one, 4-ethyl-1,3-dioxolan-2-one, 4-hydroxymethyl-1,3-dioxolan-2-one, 1,3-dioxan-2-one, 4-methyl-1,3-dioxan-2-one, 4,6-dimethyl-1,3-dioxan-2-one and 1,3-dioxopan-2-one; haloepoxy compounds, such as epichlorohydrin, epibromohydrin and α-methylepichlorohydrin, and their polyamine adducts (for example, Kymene made by Hercules: registered trademark); silane coupling agents such as γ-glycidoxypropyltrimethoxysilane and γ-aminopropyltriethoxysilane; polyvalent metallic compounds such as hydroxides and chlorides of zinc, calcium, magnesium, aluminum, iron and zirconium; and boron compounds. In view of the reactivity, particularly preferable is at least one member selected from the group consisting of polyepoxy compounds, polyamine compounds, and azetidinium salts. The amount of the crosslinking agent, as used, is in the range of preferably 0.01~30 weight %, more preferably 0.1~20 weight %, of the high-molecular compound.

The inorganic particle has different affinity for water from that of the high-molecular compound. As is mentioned above, when the high-molecular compound is hydrophilic, a hydrophobic inorganic particle is used, and when the high-molecular compound is hydrophobic, a hydrophilic inorganic particle is used.

Examples of the hydrophobic inorganic particle include hydrophobic silica, hydrophobic alumina, hydrophobic titania, hydrophobic zirconia, hydrophobic magnesia, hydrophobic zinc oxide, and hydrophobic chromium oxide. Hydrophobic silica is preferable, and hydrophobic fumed silica is more preferable.

Examples of the hydrophilic inorganic particle include silicon oxide, zinc oxide, titanium oxide, calcium carbonate, magnesium oxide, and alumina oxide. Silicon oxide is preferable, and hydrophilic fumed silica is more preferable.

The hydrophobicity degree of the inorganic particle, as used in the present invention, is not especially limited, but, for example, what has a hydrophobicity index (methanol wettability) of 5 or more is defined as the hydrophobic inorganic particle, and what has a hydrophobicity index less than 5 is defined as the hydrophilic inorganic particle.

As to the size of the inorganic particle, the average primary particle diameter is preferably 1 μm or less and particularly preferably 100 nm or less. In the case where the size of the inorganic particle is large, the fluidity of the resultant crosslinked polymer particle is poor, or it is difficult to stabilize the suspension because the arrangement to the interface between the liquid drop of the first phase and the second phase is so insufficient that the liquid drop cannot be rendered sufficiently minute when the suspension is formed.

The amount of the inorganic particle, as used, is in the range of preferably 0.001~10 weight %, more preferably 0.01~5 weight %, of the solution including the high-molecular compound and the crosslinking agent. When the amount of the inorganic particle, as used, is too large, the resultant crosslinked polymer particle tends to be an aggregate, and further, no effect rewarding the amount as used might be obtained, which is economically unfavorable. When the amount is too small, it is difficult to stabilize the suspension.

In the present invention, the use of the inorganic particle, of which the affinity for water is different from that of the high-molecular compound, enables a stable suspension to be obtained even if no surfactant that has been considered essential so far is used. However, in fields of utilization where the use of the surfactant gives little bad influence to the products and so on, the inorganic particle and the surfactant can be jointly used if necessary. Even in such a case, however, the amount of the surfactant as used is preferably as small as possible and is preferably 1 weight % or less of the solution including the high-molecular compound and the crosslinking agent.

As is mentioned above, when the high-molecular compound is hydrophilic, the first phase is a water phase, and the second phase is an oil phase. Inversely, when the high-molecular compound is hydrophobic, the first phase is an oil phase, and the second phase is a water phase.

Examples of organic solvents usable for the oil phase include: aliphatic hydrocarbons such as n-pentane, n-hexane, n-heptane, and n-octane; alicyclic hydrocarbons, which may have a substituent, such as cyclohexane, cyclooctane, methylcyclohexane, and decalin; and aromatic hydrocarbons, which may have a substituent, such as benzene, ethylbenzene, toluene, and xylene. These may be used either alone respectively or in combinations with each other. Particularly preferable ones are n-hexane, n-heptane, cyclohexane, methylcyclohexane, toluene, and xylene.

The ratio (by weight) of the first phase to the second phase is preferably in the range of (95:5)~(5:95). In the case where the amount of the first phase is too small, the particle diameter of the resultant crosslinked polymer particle tends to be difficult to control. In the case where the amount of the second phase is too small, the stirring tends to be difficult.

In the present invention, the suspension in which liquid drops of the first phase are dispersed in the second phase is obtained by stirring the first phase and the second phase in the presence of the inorganic particle, and the specific method for addition is not especially limited. In an example of the method for addition available in the present invention, the first phase is added into the second phase (to which the inorganic particle has been added beforehand) while the second phase is stirred.

The temperature or time of the crosslinking reaction is not especially limited, but it is preferable that the temperature is in the range from room temperature to the boiling point of the second phase, and that the time is in the range of 1~48 hours.

After the end of the crosslinking reaction, a hydrogel polymer is obtained. Thus, if this hydrogel polymer is dried, the crosslinked polymer particle can be obtained. The resultant crosslinked polymer particle is approximately spherical, because it is a product from a suspension. When no surfactant is used, the crosslinked polymer particle is free from a surfactant. Incidentally, the meaning of the wording "approximately spherical" includes not only spherical, but also, for example, sausage-shaped, comma-shaped, and tadpole-shaped, and is distinguished from the irregular pulverized shape as obtained by pulverizing the hydrogel resultant from aqueous solution polymerization.

In the present invention, because the crosslinking reaction is carried out in the suspension state, the particle diameter of the resultant crosslinked polymer particle can be controlled and may fitly be determined according to factors such as use purposes. Preferably, 50 weight % of the crosslinked polymer particle has a particle diameter of 150~2,000 μm.

When the high-molecular compound is hydrophilic, the present invention new approximately spherical crosslinked polymer particle which is free from a surfactant can absorb various liquids such as water, body fluids, a physiological salt solution, urine, blood, cement water, and water containing manure, and particularly, can effectively absorb electrolyte solutions such as a physiological salt solution, urine, and blood by being used in the below-mentioned specific constitution. When conventional water-absorbent resins are allowed to absorb electrolyte solutions, the swelling of the resins is restricted due to charge condensation effects of salts present in the electrolyte solutions, so the sufficient absorbency is not displayed. However, such a problem is solved by the use of the present invention crosslinked polymer particle in the specific constitution.

That is to say, the present invention approximately spherical crosslinked polymer particle is used as either one or both of an anionic and a cationic water-swellable crosslinked polymer particle, wherein the anionic and the cationic water-swellable crosslinked polymer particle are combined to give a pair of crosslinked polymer particles which are favorable for absorption of electrolyte solutions, and wherein 50~100% of functional groups in the polymer molecule of the anionic water-swellable crosslinked polymer particle are acid groups, and 50~100% of functional groups in the polymer molecule of the cationic water-swellable crosslinked polymer particle are basic groups.

Incidentally, the "use of the present invention approximately spherical crosslinked polymer particle" as referred to above may be either (1) a state where the above particle is due to be used, in other words, a state before the above combination is carried out to obtain the pair of crosslinked polymer particles which are favorable for absorption of electrolyte solutions, or (2) a state where the above particle is actually used, in other words, a state where the above combination has already been carried out to obtain the pair of crosslinked polymer particles which are favorable for absorption of electrolyte solutions.

The above combination is not especially limited, but specific examples thereof include: (i) a combination of a present invention approximately spherical crosslinked polymer particle, which is the anionic water-swellable crosslinked polymer particle of which 50~100% of functional groups in the polymer molecule are acid groups, with a cationic water-swellable crosslinked polymer particle of the irregular pulverized shape as obtained by conventional aqueous solution polymerization; (ii) a combination of another present invention approximately spherical crosslinked polymer particle, which is the cationic water-swellable crosslinked polymer particle of which 50~100% of functional groups in the polymer molecule are basic groups, with an anionic water-swellable crosslinked polymer particle of the irregular pulverized shape as obtained by conventional aqueous solution polymerization; and (iii) a combination of a present invention approximately spherical crosslinked polymer particle, which is the anionic water-swellable crosslinked polymer particle of which 50~100% of functional groups in the polymer molecule are acid groups, with another present invention approximately spherical crosslinked polymer particle which is the cationic water-swellable crosslinked polymer particle of which 50~100% of functional groups in the polymer molecule are basic groups. Particularly, mode (iii) is preferable.

In addition, the mixing ratio in the above combination, in terms of the ratio by weight of the anionic water-swellable crosslinked polymer particle to the cationic water-swellable crosslinked polymer particle, is in the range of preferably 10/90~90/10, more preferably 20/80~80/20, still more preferably 30/70~70/30, particularly preferably 40/60~60/40, in view of enablement to display the utmost desalination effect and to display high absorbency for electrolyte solutions.

Thus, an example of preferable modes is the combination of a present invention approximately spherical crosslinked polymer particle, which is the anionic water-swellable crosslinked polymer particle of which 50~100% of functional groups in the polymer molecule are acid groups, with another present invention approximately spherical crosslinked polymer particle which is the cationic water-swellable crosslinked polymer particle of which 50~100% of functional groups in the polymer molecule are basic groups, in the ratio by weight of 10/90~90/10. In addition, an example of particularly preferable modes is the combination of a present invention approximately spherical crosslinked polymer particle, which is the anionic water-swellable crosslinked polymer particle of which essentially 100% of functional groups in the polymer molecule are acid groups, with another present invention approximately spherical crosslinked polymer particle which is the cationic water-swellable crosslinked polymer particle of which essentially 100% of functional groups in the polymer molecule are basic groups, in the ratio by weight of 40/60~60/40.

If the anionic water-swellable crosslinked polymer particle is combined with the cationic water-swellable crosslinked polymer particle in the above way, the acid group in the former particle and the basic group in the latter particle produce a neutralized structure to render each group water-swellable, so that more excellent water-swellability is displayed when compared with conventional neutralized water-absorbent resins, and further that even the electrolyte which causes problems in the use of the conventional neutralized water-absorbent resins is taken in to enable the inhibition of the salt effect, thus enabling the great enhancement of the absorbency for electrolyte solutions when compared with conventional cases.

Incidentally, the technical fundamental conception on the absorption of electrolyte solutions by the combination of polymer particles, having two different ions and the ion exchangeability, is disclosed in WO92/20735, and applied examples of such technology are disclosed in WO98/24832 and WO98/37149. However, the polymer particles as used therein are limited to conventional particles of the irregular pulverized shape. Accordingly, as is mentioned above, the use of the present invention new approximately spherical crosslinked polymer particle, which is free from a surfactant, for the purpose of absorbing electrolyte solutions is the very excellent usage in respect to the freedom from a surfactant and to the approximately spherical shape, when compared with conventional cases.

When the present invention crosslinked polymer particle is the anionic water-swellable crosslinked polymer, examples thereof include water-swellable crosslinked polymers containing at least one acid group selected from the group consisting of carboxyl group, sulfonic acid group, and phosphoric acid group. Examples of such polymers include what displays the water-swellability and has been loosely crosslinked until becoming water-insoluble, specifically, homo- or copolymers of acid-group-containing polymerizable monomers, such as crosslinked polyacrylic acids. Examples of the acid-group-containing polymerizable monomers include: carboxyl-group-containing polymerizable monomers such as acrylic acid, methacrylic acid, ethacrylic acid, crotonic acid, sorbic acid, maleic acid, itaconic acid, cinnamic acid, and anhydrides thereof; sulfonic-acid-group-containing polymerizable monomers such as vinylsulfonic acid, allylsulfonic acid, styrenesulfonic acid, vinyltoluenesulfonic acid, 2-(meth)acrylamido-2-methylpropanesulfonic acid, 2-(meth)acryloylethanesulfonic acid, and 2-(meth)acryloylpropanesulfonic acid; and phosphoric-acid-group-containing polymerizable monomers such as 2-hydroxyethylacryloyl phosphate, 2-hydroxyethylmethacryloyl phosphate, phenyl-2-acryloyloxyethyl phosphate, and vinyl phosphate. Particularly preferable ones are crosslinked polyacrylic acids, crosslinked polymaleic acids, and their derivatives.

On the other hand, when the present invention crosslinked polymer particle is the cationic water-swellable crosslinked polymer, examples thereof include what displays the water-swellability and has been loosely crosslinked until becoming water-insoluble, specifically, crosslinked polyalkyleneamines, crosslinked polyvinylamines, crosslinked polyallylamines, crosslinked poly-N-vinylimidazoles, crosslinked polyvinylpyridines, crosslinked polyvinylpyridineamine oxides, crosslinked polydiallylamines, crosslinked polyamidepolyarnines, crosslinked polydimethylaminoalkyl acrylates, crosslinked polydimethylaminoalkyl methacrylates, crosslinked polydimethylaminoalkylacrylamides, crosslinked polydimethylaminoalkylmethacrylamides, crosslinked polyamidines, crosslinked polyacrylic acid hydrazines, crosslinked polymers of aspartic acid-hexamethylenediamine polycondensation products, crosslinked basic polyamino acids (e.g. polylysine), crosslinked chitosan, and copolymers of these polymers. Particularly preferable ones are crosslinked polyethylenimines, crosslinked polyallylamines, and their derivatives.

Incidentally, in the present invention, preferably at least 70 mol %, more preferably 100 mol %, of each of the anionic and the cationic water-swellable crosslinked polymer is used in the form of free acid or basic group.

The mixing of the anionic and the cationic water-swellable crosslinked polymer, for example, can be carried out by what is called dry blending. Examples of usable mixers include kneaders, almighty mixers, extruders, Nauta mixers, ribbon mixers, paddle mixers, air mixers, and conical blenders.

The absorbent article according to the present invention comprises the present invention approximately spherical crosslinked polymer particle, and is preferably obtainable by interposing an absorbent layer between a sheet with liquid permeability and a sheet with liquid impermeability, wherein the absorbent layer includes the present invention approximately spherical crosslinked polymer particle. Then, because the above absorbent article has the absorbent layer including the present invention approximately spherical crosslinked polymer particle, this absorbent article has the above-mentioned excellent absorption properties. Specifically, when the high-molecular compound is hydrophilic, the above absorbent article is useful for various industrial purposes, which need water-absorption, water-holding, wetting, swelling, and gelation, for example, as follows: articles contacting human bodies, such as disposable diapers, sanitary napkins, and incontinent pads; materials to separate water from oil; other dehydrating or drying agents; water-holding materials for plants or soil; solidifiers for muddy sediment; dewfall preventives; sealing materials for electric wires or optical fibers; and sealing materials for engineering works or constructions. In addition, when the high-molecular compound is hydrophobic, the present invention absorbent article is, for example, usable for: oil-solidifying agents such as solid fuels, solid redolent agents, transparent solid coloring agents, waste-oil-solidifying treatment agents, transparent solid redolent cosmetics, and stick-shaped adhesives; purposes for preventing pollution, such as flowed-oil-solidifying treatment agents and oil-containing-wastewater-treating agents; thickeners such as paint viscosity adjusting agents, ink viscosity adjusting agents, and asphalt viscosity adjusting agents; oil content measurement reagents, solid paraffin gel heat-storing agents, and gradually releasable substrates.

The above-mentioned sheet with liquid permeability (hereinafter referred to as liquid-permeable sheet) comprises a material that is permeable with aqueous liquids. Examples of the material forming the liquid-permeable sheet include: nonwoven fabrics, woven fabrics; porous synthetic resin films of polyethylene, polypropylene, polyester, polyamide. In addition, the above-mentioned sheet with liquid impermeability (hereinafter referred to as liquid-impermeable sheet) comprises a material that is impermeable with aqueous liquids. Examples of the material forming the liquid-impermeable sheet include: synthetic resin films of polyethylene, polypropylene, ethylene vinyl acetate, polyvinyl chloride; films of combined materials of these synthetic resins with nonwoven fabrics; films of combined materials of the above-mentioned synthetic resins with woven fabrics. Incidentally, the liquid-impermeable sheet may be permeable with vapor.

The constitution of the absorbent layer is not especially limited if it has the present invention approximately spherical crosslinked polymer particle. In addition, the process for producing the absorbent layer is not especially limited. Furthermore, the method for interposing the absorbent layer between the liquid-permeable sheet and the liquid-impermeable sheet, namely, the process for producing the absorbent article, is not especially limited.

Incidentally, it is permissible to give various functions to the above crosslinked polymer or absorbent article by further adding materials, such as deodorants, antimicrobial agents, perfumes, various inorganic powders, foaming agents, pigments, dyes, hydrophilic short fibers, manure, oxidants, reductants, water, and salts, to the crosslinked polymer.

(Effects and Advantages of the Invention):

The present invention production process has the following advantages:

(1) The advantage by carrying out the crosslinking reaction in a suspension state, that is to say, the advantage in that the crosslinked polymer is obtainable in the form of approximately spherical particles, and further in that it is easy to control the size of such particles.

(2) Because the crosslinking reaction can be carried out in a suspension state using no surfactant, approximately spherical particles free from a surfactant are obtainable by one step, so the problems of the surfactant are avoidable. Therefore, the present invention production process is particularly effective in fields of utilization which undergo the bad influence of the surfactant.

(3) The surfactant is soluble in an oil phase, but the inorganic particle is insoluble in the oil phase. Thus, when only the inorganic particle is used without using the surfactant, the oil phase undergoes no contamination, and the oil phase and the inorganic particle can easily be recovered after the reaction.

(4) The inorganic particle remains on the surface of the resultant crosslinked polymer particle. Therefore, particles of excellent fluidity are obtainable with their cohesion prevented.

DETAILED DESCRIPTION OF THE PREFERRED EMBODIMENTS

Hereinafter, the present invention is more specifically illustrated by the following examples of some preferred embodiments in comparison with comparative examples not according to the invention. However, the invention is not limited to the below-mentioned examples.

In the examples, unless otherwise noted, the units "part (s)" and "%" are by weight.

(1) Water absorption capacity of crosslinked polymer particle:

First, 0.2 g of crosslinked polymer particle was uniformly placed into a tea bag type bag (6 cm×6 cm), of which the opening was then sealed by heating, and the bag was then immersed into a 0.9% aqueous sodium chloride solution (physiological salt solution). Sixty minutes later, the bag was drawn up and then drained at 250 G for 3 minutes with a centrifuge, and the weight W1 (g) of the bag was then measured. On the other hand, the same procedure was carried out using no crosslinked polymer particle, and the resultant weight W0 (g) was measured. Thus, the water absorption capacity (g/g) was calculated from these weights W1 and W0 in accordance with the following equation:

water absorption capacity (g/g)=(W1−W0)/(weight (g) of crosslinked polymer particle).

(2) Free swelling capacity:

Hereinafter, first, the measurement apparatus as used for measuring the free swelling capacity is simply explained while referring to FIG. 1.

As is shown in FIG. 1, the measurement apparatus comprises: a scale 1; a vessel 2 of a predetermined capacity as mounted on the scale 1; an air-inhaling pipe 3; an introducing tube 4; a glass filter 6; and a measurement part 5 as mounted on the glass filter 6. The vessel 2 has an opening part 2a on the top and an opening part 2b on the side. The air-inhaling pipe 3 is inserted in the opening part 2a, and the introducing tube 4 is fitted to the opening part 2b. In addition, the vessel 2 contains a predetermined amount of electrolyte-containing aqueous solution 11. The lower end part of the air-inhaling pipe 3 is submerged in the electrolyte-containing aqueous solution 11. The glass filter 6 is formed in a diameter of 70 mm. The vessel 2 and the glass filter 6 are connected to each other through the introducing tube 4. In addition, the upper part of the glass filter 6 is fixed so as to be at the same level as of the lower end of the air-inhaling pipe 3.

The measurement part 5 comprises: a filter paper 7; a supporting cylinder 8; and a wire net 9 as attached to the bottom of the supporting cylinder 8. The measurement part 5 is formed by mounting the filter paper 7 and the supporting cylinder 8 (i.e. wire net 9) in this order on the glass filter 6. The supporting cylinder 8 is formed in an inner diameter of 60 mm. The wire net 9 is made of stainless steel and formed in 400 mesh (mesh size: 38 μm). An arrangement is made such that a predetermined amount of crosslinked polymer particle can uniformly be spread on the wire net 9.

The free swelling capacity was measured with the measurement apparatus having the above-mentioned constitution. The measurement method is hereinafter explained.

First, predetermined preparatory operations were made, in which, for example, a predetermined amount of aqueous sodium chloride solution with a concentration as adjusted to a predetermined value was placed into the vessel 2, and the air-inhaling pipe 3 was inserted into the vessel 2. Next, the filter paper 7 was mounted on the glass filter 6. On the other hand, in parallel with these mounting operations, 0.9 g of crosslinked polymer particle was uniformly spread inside the supporting cylinder 8, namely, on the wire net 9.

Next, the wire net 9, namely, the supporting cylinder 8 (in which the crosslinked polymer particle was spread), was mounted on the filter paper 7.

Then, weight $W_2$ (g) of the aqueous sodium chloride solution with a predetermined concentration, as absorbed by the crosslinked polymer particle over a period of 4 or 16 hours since the supporting cylinder 8 had been mounted on the filter paper 7, was measured with the scale 1.

Then, the free swelling capacity (g/g), over a period of 4 or 16 hours since the initiation of the absorption, was calculated from the above weight $W_2$ in accordance with the following equation:

free swelling capacity (g/g)=(weight $W_2$(g))/(weight (g) of crosslinked polymer particle).

Incidentally, all the samples as used for the measurement of the free swelling capacity are the crosslinked polymer particles with a particle diameter of 500~300 μm.

EXAMPLE 1

First, 250 g of n-hexane solution, containing 1 g of inorganic particle (trade name: Aerosil R972, made by Nippon Aerosil Co., Ltd.), was placed into a separable flask of 500 cc with a dropping funnel, a stirrer, a thermometer, and a reflux condenser, and then stirred at room temperature. Next, 2.68 g of 50% aqueous solution of ethylene glycol diglycidyl ether (trade name: Denacol EX-810, made by Nagase Chemicals, Ltd.) (as the crosslinking agent) was added under stirring to a hydrophilic high-molecular compound solution having been cooled to 0° C. beforehand and comprising 41.7 g of 30% polyethylenimine (trade name: Epomin P1000, made by Nippon Shokubai Co., Ltd.) and 29.6 g of pure water, and the resultant mixed solution was dropped to the above n-hexane solution at room temperature under stirring. Under stirring, the temperature of the system was gradually raised to 60° C., and the reaction was carried out at 60° C. for 3 hours. Then, the temperature of the system was cooled to room temperature, and the resultant spherical hydrogel was filtrated by suction and then dried under decompression at 60° C. for 48 hours, thus obtaining 12.3 g of crosslinked polymer particle (1).

Crosslinked polymer particle (1) comprised particles of 2,000~850 μm and particles of 850~150 μm in ratios of 45% and 55% respectively. The above suction filtration allowed 58% of the added Aerosil to be recovered. The resultant crosslinked polymer particle (1) displayed a water absorption capacity of 10.0 g/g for the physiological salt solution, and further, was a rustling particle excellent in fluidity, so its handling was possible as independent particle each other.

EXAMPLE 2

First, 250 g of n-hexane solution, containing 0.5 g of inorganic particle (trade name: Aerosil R972, made by Nippon Aerosil Co., Ltd.) and 0.1 g of sorbitan monostearate, was placed into a separable flask of 500 cc with a dropping funnel, a stirrer, a thermometer, and a reflux condenser, and then stirred at room temperature. Next, 2.68 g of 50% aqueous solution of ethylene glycol diglycidyl ether (trade name: Denacol EX-810, made by Nagase Chemicals, Ltd.) (as the crosslinking agent) was added under stirring to a hydrophilic high-molecular compound solution having been cooled to 0° C. beforehand and comprising 41.7 g of 30% polyethylenimine (trade name: Epomin P1000, made by Nippon Shokubai Co., Ltd.) and 29.6 g of pure water, and the resultant mixed solution was dropped to the above n-hexane solution at room temperature under stirring. Under stirring, the temperature of the system was gradually raised to 60° C., and the reaction was carried out at 60° C. for 3 hours. Then, the temperature of the system was cooled to room temperature, and the resultant spherical hydrogel was filtrated by suction and then washed with pure water for 24 hours and then dried under decompression at 60° C. for 48 hours, thus obtaining 12.0 g of crosslinked polymer particle (2).

Crosslinked polymer particle (2) comprised particles of 2,000~850 μm and particles of 850~150 μm in ratios of 18% and 82% respectively. The above suction filtration allowed 30% of the added Aerosil to be recovered. The resultant crosslinked polymer particle (2) displayed a water absorption capacity of 10.5 g/g for the physiological salt solution, and further, was a rustling particle excellent in fluidity, so its handling was possible as independent particle each other.

EXAMPLE 3

First, 10 liters of cyclohexane solution, containing 100 g of inorganic particle (trade name: Aerosil R972, made by Nippon Aerosil Co., Ltd.), was placed into a stainless bottle of 20 liters with a dropping funnel, a stirrer, a thermometer, and a reflux condenser, and then stirred at room temperature. Next, 363 g of 50% aqueous solution of ethylene glycol diglycidyl ether (trade name: Denacol EX-810, made by Nagase Chemicals, Ltd.) (as the crosslinking agent) was added under stirring to a hydrophilic high-molecular compound solution having been cooled to 0° C. beforehand and comprising 5,636 g of 30% polyethylenimine (trade name: Epomin P1000, made by Nippon Shokubai Co., Ltd.) and 4,000 g of pure water, thus preparing an aqueous solution containing a crosslinking agent and a hydrophilic high-molecular compound. Then, this solution was added to the above cyclohexane solution at room temperature under stirring. Under stirring, the temperature of the system was gradually raised to 65° C., and the reaction was carried out at 65° C. for 3 hours. Then, the temperature of the system was cooled to room temperature, and the resultant spherical hydrogel was filtrated by suction and then dried under decompression at 60° C. for 48 hours, thus obtaining crosslinked polymer particle (3).

Crosslinked polymer particle (3) comprised particles of 850~106 μm in a ratio of 92.7% and had an average particle diameter of 420 μm, and further, was a rustling particle excellent in fluidity, so its handling was possible as independent particle each other. Crosslinked polymer particle (3) displayed a water absorption capacity of 10.1 g/g for the physiological salt solution.

COMPARATIVE EXAMPLE 1

First, 250 g of n-hexane solution, containing 2.5 g of sorbitan monostearate, was placed into a separable flask of 500 cc with a dropping funnel, a stirrer, a thermometer, and a reflux condenser, and then heated to 60° C. under stirring. Next, 2.68 g of 50% aqueous solution of ethylene glycol diglycidyl ether (trade name: Denacol EX-810, made by Nagase Chemicals, Ltd.) (as the crosslinking agent) was added under stirring to a hydrophilic high-molecular compound solution having been cooled to 0° C. beforehand and comprising 41.7 g of 30% polyethylenimine (trade name: Epomin P1000, made by Nippon Shokubai Co., Ltd.) and 29.6 g of pure water, and the resultant mixed solution was dropped to the above n-hexane solution at room temperature under stirring. While the temperature of the system was kept at 60° C., the reaction was carried out for 3 hours. Then, the temperature of the system was cooled to room temperature, and the resultant spherical hydrogel was filtrated by suction and then dried at 60° C. for 48 hours, thus obtaining comparative crosslinked polymer particle (1).

Even at room temperature, each particle of comparative crosslinked polymer particle (1) was so tacky that comparative crosslinked polymer particle (1) had no fluidity.

EXAMPLE 4

First, 600 ml of cyclohexane solution, containing 6 g of inorganic particle (trade name: Aerosil R972, made by Nippon Aerosil Co., Ltd.), was placed into a separable flask of 2 liters with a dropping funnel, a stirrer, a thermometer, a reflux condenser, and a built-in baffle, and then stirred at room temperature. Next, 13.8 g of 52% aqueous solution of ethylene glycol diglycidyl ether (trade name: Denacol EX-810, made by Nagase Chemicals, Ltd.) (as the crosslinking agent) was added under stirring to an aqueous hydrophilic high-molecular compound solution having been cooled to 0° C. beforehand and comprising 337.2 g of 30% polyethylenimine (trade name: Epomin P1000, made by Nippon Shokubai Co., Ltd.) and 249 g of pure water, thus preparing an aqueous solution containing a crosslinking agent and a hydrophilic high-molecular compound. Then, this solution was added to the above cyclohexane solution at room temperature under stirring. Under stirring, the temperature of the system was gradually raised to 65° C., and the reaction was carried out at 65° C. for 3 hours. Then, the temperature of the system was cooled to room temperature, and the resultant spherical hydrogel was filtrated by suction, and then immersed in a large amount of pure water for 24 hours, and then filtered off, and then dried at 60° C. with hot air for 6 hours, thus obtaining crosslinked polymer particle (4).

Figure 2:
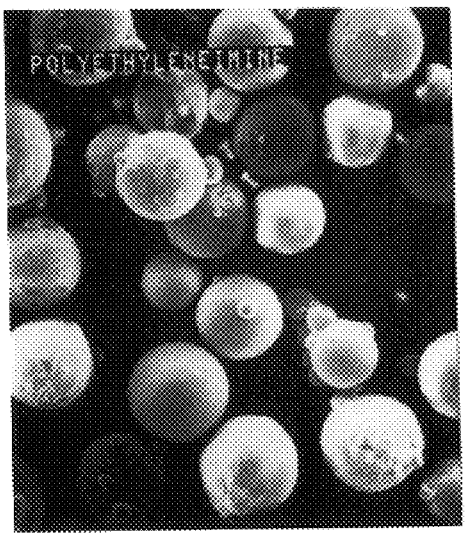
FIG. 2 is a micrograph of the appearance of crosslinked polymer particle (4).

Crosslinked polymer particle (4) was spherical, and its yield in terms of particles of 850~150 μm relative to the amount of the starting materials as charged was 99%. Crosslinked polymer particle (4) had an average particle diameter of 480 μm. The appearance of crosslinked polymer particle (4) is shown in the micrograph of FIG. 2. Crosslinked polymer particle (4) had a water absorption capacity of 12.0 g/g for the physiological salt solution and displayed a free swelling capacity of 23.5 g/g for the physiological salt solution (aqueous sodium chloride solution of 0.154 mol/liter) in 4 hours.

EXAMPLE 5

Figure 3:
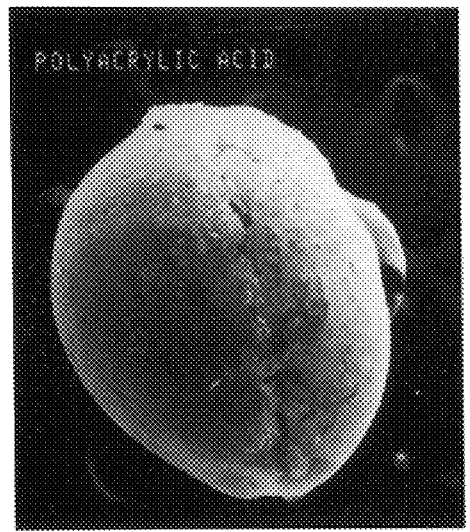
FIG. 3 is a micrograph of the appearance of crosslinked polymer particle (5).

First, 100 ml of cyclohexane solution, containing 0.5 g of inorganic particle (trade name: Aerosil RA200HS, made by Nippon Aerosil Co., Ltd.), was placed into a separable flask of 500 cc with a dropping funnel, a stirrer, a thermometer, and a reflux condenser, and then stirred at room temperature. Next, 0.3 g of oxazoline-group-containing polymer with a concentration of 40% (trade name: WS700, made by Nippon Shokubai Co., Ltd.) (as the crosslinking agent) was added to 30.2 g of aqueous polyacrylic acid solution with a concentration of 35% (Aldrich, Inc. reagent catalogue No. 41,600-2) (as the hydrophilic high-molecular compound) under stirring at room temperature, thus preparing an aqueous solution containing a crosslinking agent and a hydrophilic high-molecular compound. Then, this solution was added to the above cyclohexane solution at room temperature under stirring. Under stirring, the temperature of the system was gradually raised to 67° C., and the reaction was carried out at 67° C. for 4 hours. Then, the temperature of the system was cooled to room temperature, and the resultant spherical hydrogel was filtrated by suction and then dried at 80° C. with hot air for 2 hours, thus obtaining crosslinked polymer particle (5), of which the appearance is shown in the micrograph of FIG. 3, and which had a water absorption capacity of 3.3 g/g for the physiological salt solution.

EXAMPLE 6

First, 600 ml of cyclohexane solution, containing 6 g of inorganic particle (trade name: Aerosil R972, made by Nippon Aerosil Co., Ltd.), was placed into a separable flask of 2 liters with a dropping funnel, a stirrer, a thermometer, a reflux condenser, and a built-in baffle, and then stirred at room temperature. Next, a crosslinking agent solution, as prepared by dissolving 5.94 g of N,N'-methylenebisacrylamide (made by Nitto Chemical Industry Co., Ltd.) (as the crosslinking agent) into a mixed solvent comprising 30 g of pure water and 60 g of methanol, was added under stirring to an aqueous hydrophilic high-molecular compound solution having been cooled to 0° C. beforehand and comprising 337.3 g of 30% polyethylenimine (trade name: Epomin P1000, made by Nippon Shokubai Co., Ltd.) and 166.8 g of pure water, thus preparing an aqueous liquid containing a crosslinking agent and a hydrophilic high-molecular compound. Then, this solution was added to the above cyclohexane solution at room temperature under stirring. Under stirring, the temperature of the system was gradually raised to 65° C., and the reaction was carried out at 65° C. for 3 hours. Then, the temperature of the system was cooled to room temperature, and the resultant spherical hydrogel was filtrated by suction, and then immersed in a large amount of pure water for 24 hours, and then filtered off, and then dried at 60° C. with hot air for 6 hours, thus obtaining crosslinked polymer particle (6), which had a water absorption capacity of 9.6 g/g for the physiological salt solution.

EXAMPLE 7

First, 600 ml of cyclohexane solution, containing 6 g of inorganic particle (trade name: Aerosil R972, made by Nippon Aerosil Co., Ltd.), was placed into a separable flask of 2 liters with a dropping funnel, a stirrer, a thermometer, a reflux condenser, and a built-in baffle, and then stirred at room temperature. Next, a crosslinking agent solution, as prepared by dissolving 3.04 g of N,N'-methylenebisacrylamide (made by Nitto Chemical Industry Co., Ltd.) (as the crosslinking agent) into 90 g of methanol, was added under stirring to an aqueous hydrophilic high-molecular compound solution having been cooled to 0° C. beforehand and comprising 337.3 g of 30% polyethylenimine (trade name: Epomin P1000, made by Nippon Shokubai Co., Ltd.) and 166.8 g of pure water, thus preparing an aqueous liquid containing a crosslinking agent and a hydrophilic high-molecular compound. Then, this solution was added to the above cyclohexane solution at room temperature under stirring. Under stirring, the temperature of the system was gradually raised to 65° C., and the reaction was carried out at 65° C. for 3 hours. Then, the temperature of the system was cooled to room temperature, and the resultant spherical hydrogel was filtrated by suction, and then immersed in a large amount of pure water for 24 hours, and then filtered off, and then dried at 60° C. with hot air for 6 hours, thus obtaining crosslinked polymer particle (7), which had a water absorption capacity of 13.3 g/g for the physiological salt solution.

EXAMPLE 8

First, 600 ml of cyclohexane solution, containing 6 g of inorganic particle (trade name: Aerosil R972, made by Nippon Aerosil Co., Ltd.), was placed into a separable flask of 2 liters with a dropping funnel, a stirrer, a thermometer, a reflux condenser, and a built-in baffle, and then stirred at room temperature. Next, a crosslinking agent solution, as prepared by dissolving 10.12 g of N,N'-methylenebisacrylamide (made by Nitto Chemical Industry Co., Ltd.) (as the crosslinking agent) into a mixed solvent comprising 50 g of pure water and 100 g of methanol, was added under stirring to an aqueous hydrophilic high-molecular compound solution having been cooled to 0° C. beforehand and comprising 337.3 g of 30% polyethylenimine (trade name: Epomin P1000, made by Nippon Shokubai Co., Ltd.) and 102.5 g of pure water, thus preparing an aqueous liquid containing a crosslinking agent and a hydrophilic high-molecular compound. Then, this solution was added to the above cyclohexane solution at room temperature under stirring. Under stirring, the temperature of the system was gradually raised to 65° C., and the reaction was carried out at 65° C. for 3 hours. Then, the temperature of the system was cooled to room temperature, and the resultant spherical hydrogel was filtrated by suction and then dried at 60° C. with hot air for 6 hours, thus obtaining crosslinked polymer particle (8), which had a water absorption capacity of 7.0 g/g for the physiological salt solution and comprised particles of 850~500 μm, particles of 500~300 μm, and particles of 300~106 μm in ratios of 54.1%, 29.9%, and 16.0% respectively.

EXAMPLE 9

First, 600 ml of cyclohexane solution, containing 6 g of inorganic particle (trade name: Aerosil R972, made by Nippon Aerosil Co., Ltd.), was placed into a separable flask of 2 liters with a dropping funnel, a stirrer, a thermometer, a reflux condenser, and a built-in baffle, and then stirred at room temperature. Next, 14.16 g of ethylene glycol diglycidyl ether (trade name: Denacol EX-810, made by Nagase Chemicals, Ltd.) (as the crosslinking agent) was added under stirring to 600 g of 10% aqueous polyallylamine solution (trade name: PAA-10C, made by Nitto Boseki Co., Ltd.) which was an aqueous hydrophilic high-molecular compound solution as cooled to 0° C. beforehand, thus preparing an aqueous solution containing a crosslinking agent and a hydrophilic high-molecular compound. Then, this solution was added to the above cyclohexane solution at room temperature under stirring. Under stirring, the temperature of the system was gradually raised to 60° C., and the reaction was carried out at 60° C. for 3 hours. Then, the temperature of the system was cooled to room temperature, and the resultant spherical hydrogel was filtrated by suction and then dried at 60° C. with hot air for 2 hours, thus obtaining crosslinked polymer particle (9), which had a water absorption capacity of 8.5 g/g for the physiological salt solution and comprised particles of 850~500 μm, particles of 500~300 μm, particles of 300~106 μm, and particles of 106~45 μm in ratios of 0.5%, 5.7%, 84.2%, and 9.6% respectively.

REFERENTIAL EXAMPLE 1

First, 215 ml of cyclohexane and 1.29 g of ethylcellulose were added into a separable flask of 500 ml with a dropping funnel, a stirrer, a thermometer, and a reflux condenser. Then, a nitrogen gas was blown into the flask to remove oxygen as dissolved in the system, and the temperature was then raised to 65° C. Separately, an aqueous monomer solution was prepared by: dissolving 14.0 g of acrylic acid into 56.0 g of distilled water; dissolving 0.0056 g of sodium persulfate and 0.0899 g of N,N'-methylenebisacrylamide into the resultant aqueous acrylic acid solution; and blowing a nitrogen gas into the resultant mixture to remove oxygen as dissolved therein. The above-prepared aqueous monomer solution was dropped to the cyclohexane solution in the above separable flask over a period of 15 minutes. After the dropping had been completed, the temperature of the system was kept at 65° C. to carry out polymerization for 4 hours. After the end of the polymerization, water was removed by azeotropic dehydration, thus obtaining a spherical hydrogel crosslinked polymer particle with a water content of 40%. The resultant spherical hydrogel crosslinked polymer particle was isolated by filtration and then dried under decompression at 80° C. for 18 hours, thus obtaining crosslinked polymer particle (10), which had a water absorption capacity of 6.5 g/g for the physiological salt solution.

REFERENTIAL EXAMPLE 2

First, 215 ml of cyclohexane solution, containing 1.68 g of inorganic particle (trade name: Aerosil R974, made by Nippon Aerosil Co., Ltd.), was placed into a separable flask of 500 cc with a dropping funnel, a stirrer, a thermometer, and a reflux condenser, and then heated to 65° C. and stirred under a nitrogen gas current. Next, an aqueous monomer solution was prepared by dissolving 14.0 g of acrylic acid into 56.0 g of distilled water and adding 0.0056 g of sodium persulfate and 0.0899 g of N,N'-methylenebisacrylamide to the resultant aqueous acrylic acid solution into which a nitrogen gas was blown. Next, while the temperature of the system was kept at 65° C., the above-prepared aqueous monomer solution was dropped to the cyclohexane solution in the above separable flask over a period of 15 minutes under stirring to carry out polymerization at 65° C. for 4 hours. The spherical hydrogel resultant from the polymerization was filtrated by suction and then dried under decompression at 80° C. for 12 hours, thus obtaining crosslinked polymer particle (11), which had a water absorption capacity of 4.6 g/g for the physiological salt solution.

REFERENTIAL EXAMPLE 3

First, 296.2 parts of acrylic acid, 2.532 parts of N,N'-methylenebisacrylamide (as the copolymerizable crosslinking agent), and 1,163.0 parts of water were mixed and degassed with a nitrogen gas for 60 minutes, and then placed into an air-tight vessel free to open and close. While the liquid temperature was kept at 23° C. under nitrogen atmosphere, the nitrogen displacement of the reaction system was continued. Next, 8.96 parts of 10% aqueous 2,2'-azobis(2-amidinopropane) dihydrochloride solution, 2.96 parts of 10% aqueous hydrogen peroxide solution, and 7.4 parts of 1% aqueous L-ascorbic acid solution were added into the above vessel under stirring, so that a polymerization reaction got started 2.5 minutes after, and that the reaction system reached the peak temperature 25 minutes after. Then, 30 minutes after the polymerization temperature had reached its peak, the resultant crosslinked hydrogel polymer was got out and then chopped into small pieces with a meat chopper. The resultant crosslinked and chopped hydrogel polymer was dried in a hot-air drying oven of 60° C. for 16 hours, and the resultant dry product was pulverized with a laboratory pulverizer. The resultant pulverized product was allowed to pass a wire screen of 850 μm in mesh size, and the passed product was separated, thus obtaining crosslinked polymer particle (12), which had a water absorption capacity of 5.7 g/g for the physiological salt solution and displayed a free swelling capacity of 12.5 g/g for the physiological salt solution (aqueous sodium chloride solution of 0.154 mol/liter) in 4 hours.

REFERENTIAL EXAMPLE 4

First, 69.63 parts of acrylic acid, 0.074 parts of N,N'-methylenebisacrylamide (as the copolymerizable crosslinking agent), and 275.8 parts of water were mixed and degassed with a nitrogen gas for 60 minutes, and then placed into an air-tight vessel free to open and close. While the liquid temperature was kept at 21° C. under nitrogen atmosphere, the nitrogen displacement of the reaction system was continued. Next, 2.1 parts of 10% aqueous 2,2'-azobis(2-amidinopropane) dihydrochloride solution, 0.7 parts of 10% aqueous hydrogen peroxide solution, and 1.7 parts of 1% aqueous L-ascorbic acid solution were added into the above vessel under stirring, so that a polymerization reaction got started 3 minutes after, and that the reaction system reached the peak temperature 32 minutes after. Then, 30 minutes after the polymerization temperature had reached its peak, the resultant crosslinked hydrogel polymer was got out and then chopped into small pieces with a meat chopper. The resultant crosslinked and chopped hydrogel polymer was dried in a hot-air drying oven of 60° C. for 16 hours, and the resultant dry product was pulverized with a laboratory pulverizer. The resultant pulverized product was allowed to pass a wire screen of 850 μm in mesh size, and the passed product was separated, thus obtaining crosslinked polymer particle (13), which had a water absorption capacity of 8.8 g/g for the physiological salt solution.

REFERENTIAL EXAMPLE 5

First, 296.2 parts of acrylic acid, 1.266 parts of N,N'-methylenebisacrylamide (as the copolymerizable crosslinking agent), and 1,164.2 parts of water were mixed and degassed with a nitrogen gas for 60 minutes, and then placed into an air-tight vessel free to open and close. While the liquid temperature was kept at 23° C. under nitrogen atmosphere, the nitrogen displacement of the reaction system was continued. Next, 8.96 parts of 10% aqueous 2,2'-azobis(2-amidinopropane) dihydrochloride solution, 2.96 parts of 10% aqueous hydrogen peroxide solution, and 7.4 parts of 1% aqueous L-ascorbic acid solution were added into the above vessel under stirring, so that a polymerization reaction got started 2.5 minutes after, and that the reaction system reached the peak temperature 25 minutes after. Then, 30 minutes after the polymerization temperature had reached its peak, the resultant crosslinked hydrogel polymer was got out and then chopped into small pieces with a meat chopper. The resultant crosslinked and chopped hydrogel polymer was dried in a hot-air drying oven of 60° C. for 16 hours, and the resultant dry product was pulverized with a laboratory pulverizer. The resultant pulverized product was allowed to pass a wire screen of 850 μm in mesh size, and the passed product was separated, thus obtaining crosslinked polymer particle (14), which had a water absorption capacity of 6.3 g/g for the physiological salt solution.

REFERENTIAL EXAMPLE 6

First, 69.33 parts of acrylic acid, 0.37 parts of N,N'-methylenebisacrylamide (as the copolymerizable crosslinking agent), and 275.8 parts of water were mixed and degassed with a nitrogen gas for 60 minutes, and then placed into an air-tight vessel free to open and close. While the liquid temperature was kept at 21° C. under nitrogen atmosphere, the nitrogen displacement of the reaction system was continued. Next, 2.1 parts of 10% aqueous 2,2'-azobis(2-amidinopropane) dihydrochloride solution, 0.7 parts of 10% aqueous hydrogen peroxide solution, and 1.7 parts of 1% aqueous L-ascorbic acid solution were added into the above vessel under stirring, so that a polymerization reaction got started 3 minutes after, and that the reaction system reached the peak temperature 40 minutes after. Then, 30 minutes after the polymerization temperature had reached its peak, the resultant crosslinked hydrogel polymer was got out and then chopped into small pieces with a meat chopper. The resultant crosslinked and chopped hydrogel polymer was dried in a hot-air drying oven of 60° C. for 16 hours, and the resultant dry product was pulverized with a laboratory pulverizer. The resultant pulverized product was allowed to pass a wire screen of 850 μm in mesh size, and the passed product was separated, thus obtaining crosslinked polymer particle (15), which had a water absorption capacity of 6.3 g/g for the physiological salt solution.

REFERENTIAL EXAMPLE 7

First, 69.26 parts of acrylic acid, 0.44 parts of N,N'-methylenebisacrylamide (as the copolymerizable crosslinking agent), and 275.8 parts of water were mixed and degassed with a nitrogen gas for 60 minutes, and then placed into an air-tight vessel free to open and close. While the liquid temperature was kept at 23° C. under nitrogen atmosphere, the nitrogen displacement of the reaction system was continued. Next, 2.1 parts of 10% aqueous 2,2'-azobis(2-amidinopropane) dihydrochloride solution, 0.7 parts of 10% aqueous hydrogen peroxide solution, and 1.7 parts of 1% aqueous L-ascorbic acid solution were added into the above vessel under stirring, so that a polymerization reaction got started 3 minutes after, and that the reaction system reached the peak temperature 25 minutes after. Then, 30 minutes after the polymerization temperature had reached its peak, the resultant crosslinked hydrogel polymer was got out and then chopped into small pieces with a meat chopper. The resultant crosslinked and chopped hydrogel polymer was dried in a hot-air drying oven of 150° C. for 1 hours, and the resultant dry product was pulverized with a laboratory pulverizer. The resultant pulverized product was allowed to pass a wire screen of 850 µm in mesh size, and the passed product was separated, thus obtaining crosslinked polymer particle (16), which had a water absorption capacity of 5.6 g/g for the physiological salt solution.

REFERENTIAL EXAMPLE 8

First, 296.2 parts of acrylic acid, 0.950 parts of N,N'-methylenebisacrylamide (as the copolymerizable crosslinking agent), and 1,164.5 parts of water were mixed and degassed with a nitrogen gas for 60 minutes, and then placed into an air-tight vessel free to open and close. While the liquid temperature was kept at 23° C. under nitrogen atmosphere, the nitrogen displacement of the reaction system was continued. Next, 8.96 parts of 10% aqueous 2,2'-azobis(2-amidinopropane) dihydrochloride solution, 2.96 parts of 10% aqueous hydrogen peroxide solution, and 7.4 parts of 1% aqueous L-ascorbic acid solution were added into the above vessel under stirring, so that a polymerization reaction got started 2.5 minutes after, and that the reaction system reached the peak temperature 25 minutes after. Then, 30 minutes after the polymerization temperature had reached its peak, the resultant crosslinked hydrogel polymer was got out and then chopped into small pieces with a meat chopper. The resultant crosslinked and chopped hydrogel polymer was dried in a hot-air drying oven of 60° C. for 16 hours, and the resultant dry product was pulverized with a laboratory pulverizer. The resultant pulverized product was allowed to pass a wire screen of 850 µm in mesh size, and the passed product was separated, thus obtaining crosslinked polymer particle (17), which had a water absorption capacity of 7.1 g/g for the physiological salt solution.

REFERENTIAL EXAMPLE 9

First, 68.97 parts of acrylic acid, 1.04 parts of N,N'-methylenebisacrylamide (as the copolymerizable crosslinking agent), and 275.8 parts of water were mixed and degassed with a nitrogen gas for 60 minutes, and then placed into an air-tight vessel free to open and close. While the liquid temperature was kept at 23° C. under nitrogen atmosphere, the nitrogen displacement of the reaction system was continued. Next, 2.1 parts of 10% aqueous 2,2'-azobis(2-amidinopropane) dihydrochloride solution, 0.7 parts of 10% aqueous hydrogen peroxide solution, and 1.7 parts of 1% aqueous L-ascorbic acid solution were added into the above vessel under stirring, so that a polymerization reaction got started 4 minutes after, and that the reaction system reached the peak temperature 21 minutes after. Then, 30 minutes after the polymerization temperature had reached its peak, the resultant crosslinked hydrogel polymer was got out and then chopped into small pieces with a meat chopper. The resultant crosslinked and chopped hydrogel polymer was dried in a hot-air drying oven of 60° C. for 16 hours, and the resultant dry product was pulverized with a laboratory pulverizer. The resultant pulverized product was allowed to pass a wire screen of 850 µm in mesh size, and the passed product was separated, thus obtaining crosslinked polymer particle (18), which had a water absorption capacity of 5.5 g/g for the physiological salt solution.

EXAMPLE 10

Dry blending of 100 parts of crosslinked polymer particle (4) and 100 parts of crosslinked polymer particle (12) gave 200 parts of crosslinked polymer particle (19), which displayed a free swelling capacity of 44.5 g/g for the physiological salt solution (aqueous sodium chloride solution of 0.154 mol/liter) in 4 hours.

Figure 4:
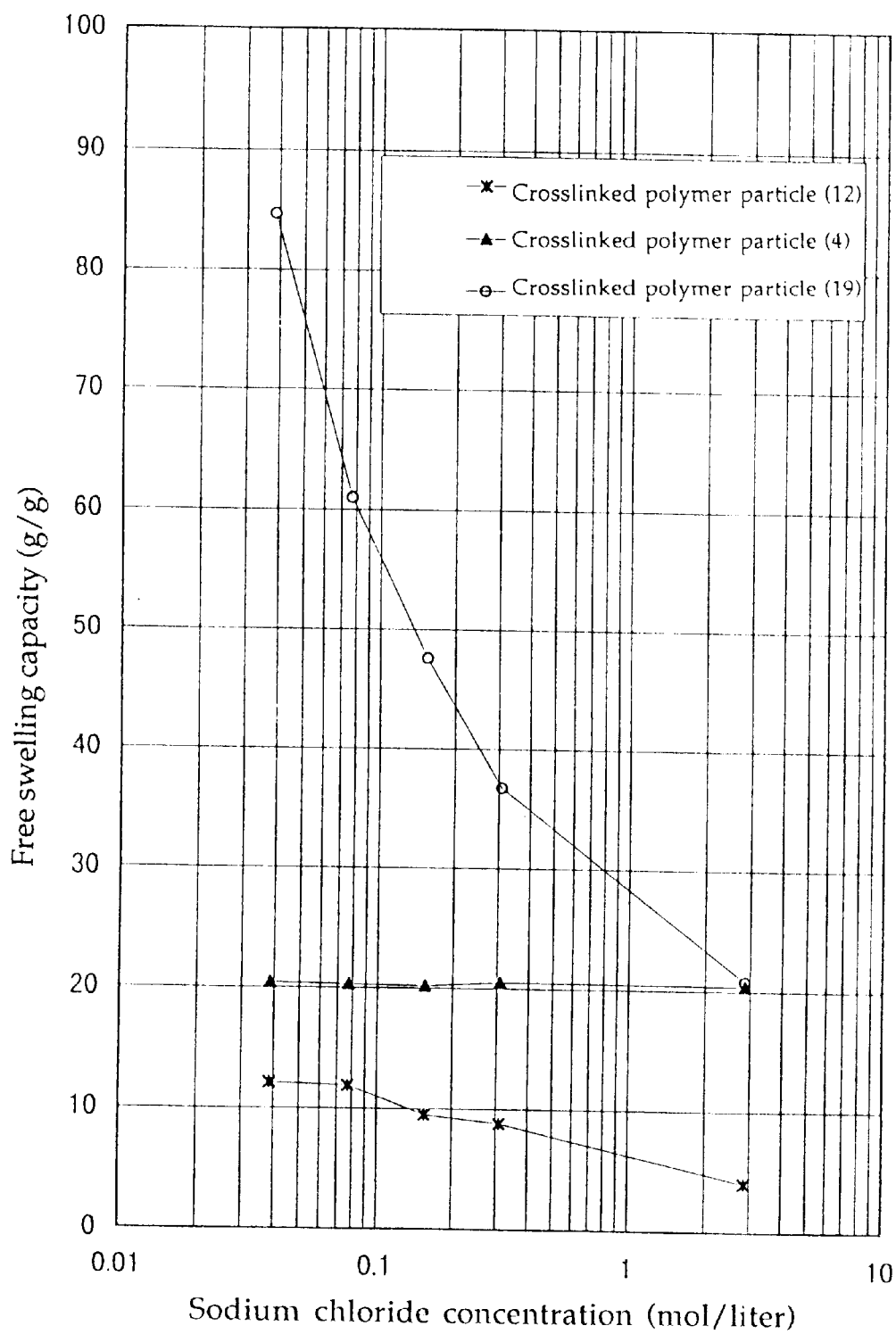
FIG. 4 is a plotted diagram of the free swelling capacities of crosslinked polymer particles for electrolyte solutions.

In addition, the free swelling capacities of crosslinked polymer particles (4), (12), and (19) for aqueous sodium chloride solutions of 0.0385 mol/liter, 0.077 mol/liter, 0.154 mol/liter, 0.308 mol/liter, and 2.85 mol/liter respectively, as displayed in 16 hours, were measured. Results thereof are shown in FIG. 4.

EXAMPLE 11

Dry blending of 100 parts of crosslinked polymer particle (4) and 100 parts of crosslinked polymer particle (10) gave 200 parts of crosslinked polymer particle (20), which displayed free swelling capacities of 40.0 g/g and 53.0 g/g for the physiological salt solution (aqueous sodium chloride solution of 0.154 mol/liter) in 4 hours and 16 hours respectively.

EXAMPLE 12

Dry blending of 100 parts of crosslinked polymer particle (6) and 100 parts of crosslinked polymer particle (12) gave 200 parts of crosslinked polymer particle (21), which displayed a free swelling capacity of 45.7 g/g for the physiological salt solution (aqueous sodium chloride solution of 0.154 mol/liter) in 4 hours.

EXAMPLE 13

Dry blending of 100 parts of crosslinked polymer particle (7) and 100 parts of crosslinked polymer particle (12) gave 200 parts of crosslinked polymer particle (22), which displayed a free swelling capacity of 45.4 g/g for the physiological salt solution (aqueous sodium chloride solution of 0.154 mol/liter) in 4 hours.

EXAMPLE 14

Dry blending of 100 parts of crosslinked polymer particle (8) and 100 parts of crosslinked polymer particle (12) gave 200 parts of crosslinked polymer particle (23), which displayed a free swelling capacity of 46.0 g/g for the physiological salt solution (aqueous sodium chloride solution of 0.154 mol/liter) in 4 hours.

EXAMPLE 15

Dry blending of 60 parts of crosslinked polymer particle (9) and 100 parts of crosslinked polymer particle (12) gave 160 parts of crosslinked polymer particle (24), which displayed free swelling capacities of 40.8 g/g and 50.4 g/g for the physiological salt solution (aqueous sodium chloride solution of 0.154 mol/liter) in 4 hours and 16 hours respectively.

EXAMPLE 16

Dry blending of 100 parts of crosslinked polymer particle (4) and 100 parts of crosslinked polymer particle (13) gave 200 parts of crosslinked polymer particle (25), which displayed a free swelling capacity of 49.5 g/g for the physiological salt solution (aqueous sodium chloride solution of 0.154 mol/liter) in 4 hours.

EXAMPLE 17

Dry blending of 100 parts of crosslinked polymer particle (4) and 100 parts of crosslinked polymer particle (14) gave 200 parts of crosslinked polymer particle (26), which displayed a free swelling capacity of 47.0 g/g for the physiological salt solution (aqueous sodium chloride solution of 0.154 mol/liter) in 4 hours.

EXAMPLE 18

Dry blending of 100 parts of crosslinked polymer particle (4) and 100 parts of crosslinked polymer particle (15) gave 200 parts of crosslinked polymer particle (27), which displayed a free swelling capacity of 46.6 g/g for the physiological salt solution (aqueous sodium chloride solution of 0.154 mol/liter) in 4 hours.

EXAMPLE 19

Dry blending of 100 parts of crosslinked polymer particle (4) and 100 parts of crosslinked polymer particle (16) gave 200 parts of crosslinked polymer particle (28), which displayed a free swelling capacity of 44.1 g/g for the physiological salt solution (aqueous sodium chloride solution of 0.154 mol/liter) in 4 hours.

EXAMPLE 20

Dry blending of 100 parts of crosslinked polymer particle (4) and 100 parts of crosslinked polymer particle (17) gave 200 parts of crosslinked polymer particle (29), which displayed a free swelling capacity of 47.6 g/g for the physiological salt solution (aqueous sodium chloride solution of 0.154 mol/liter) in 4 hours.

EXAMPLE 21

Dry blending of 100 parts of crosslinked polymer particle (4) and 100 parts of crosslinked polymer particle (18) gave 200 parts of crosslinked polymer particle (30), which displayed a free swelling capacity of 44.1 g/g for the physiological salt solution (aqueous sodium chloride solution of 0.154 mol/liter) in 4 hours.

EXAMPLE 22

Dry blending of 100 parts of crosslinked polymer particle (12) and 55 parts of (anhydrous) sodium carbonate powder (special grade reagent; made by Kishida Chemical Co., Ltd.) gave 155 parts of crosslinked polymer particle (31), which displayed a free swelling capacity of 35.0 g/g for the physiological salt solution (aqueous sodium chloride solution of 0.154 mol/liter) in 4 hours.

EXAMPLE 23

Dry blending of 100 parts of crosslinked polymer particle (4) and 107 parts of citric acid monohydrate powder (special grade reagent; made by Kanto Chemical Co., Inc.) gave 207 parts of crosslinked polymer particle (32), which displayed a free swelling capacity of 16.4 g/g for the physiological salt solution (aqueous sodium chloride solution of 0.154 mol/liter) in 4 hours.

EXAMPLE 24

Dry blending of 100 parts of crosslinked polymer particle (16) and 60 parts of crosslinked polymer particle (9) gave 160 parts of crosslinked polymer particle (33), which displayed free swelling capacities of 40.1 g/g and 51.3 g/g for the physiological salt solution (aqueous sodium chloride solution of 0.154 mol/liter) in 4 hours and 16 hours respectively.

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A production process for a water-swellable crosslinked polymer particle, comprising the steps of:

forming a water-drop-in-oil type suspension in which liquid drops of a water phase are dispersed in an oil phase by stirring both phases in the presence of a hydrophobic inorganic particle, wherein the water phase includes a hydrophilic high-molecular compound and a crosslinking agent; and carrying out a crosslinking reaction in a state where the hydrophobic inorganic particle is aggregated on surfaces of liquid drops of the water phase.

2. A production process according to claim 1, wherein the hydrophobic inorganic particle is hydrophobic fumed silica.

3. A production process according to claim 1, wherein the amount of the hydrophobic inorganic particle relative to the water phase including the hydrophilic high-molecular compound and the crosslinking agent is in the range of 0.001~10 weight %.

4. A production process for a water-swellable crosslinked polymer particle according to claim 1, wherein the hydrophilic high-molecular compound is any of a cationic polymer, an anionic polymer, and a nonionic polymer.

* * * * *